United States Patent
Yip et al.

(10) Patent No.: US 12,523,144 B2
(45) Date of Patent: Jan. 13, 2026

(54) SYSTEM AND METHOD FOR NON-INVASIVE DETECTION AT A WELLSITE

(71) Applicant: Schlumberger Technology Corporation, Sugar Land, TX (US)

(72) Inventors: Wai Sum Wilson Yip, Houston, TX (US); Courtney Payne, Stafford, TX (US); Sascha Trummer, Richmond, TX (US); Sergio Alberto Rondon Fajardo, Houston, TX (US); Ryan Richard Leroux, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 191 days.

(21) Appl. No.: 18/248,102

(22) PCT Filed: Oct. 6, 2021

(86) PCT No.: PCT/US2021/053788
§ 371 (c)(1),
(2) Date: Apr. 6, 2023

(87) PCT Pub. No.: WO2022/076571
PCT Pub. Date: Apr. 14, 2022

(65) Prior Publication Data
US 2023/0383646 A1    Nov. 30, 2023

Related U.S. Application Data

(60) Provisional application No. 63/088,668, filed on Oct. 7, 2020.

(51) Int. Cl.
*E21B 47/107* (2012.01)
*E21B 21/08* (2006.01)
(Continued)

(52) U.S. Cl.
CPC ............ *E21B 47/107* (2020.05); *E21B 21/08* (2013.01); *E21B 47/00* (2013.01); *E21B 47/07* (2020.05); *G01F 1/74* (2013.01)

(58) Field of Classification Search
CPC ...................................................... E21B 21/08
See application file for complete search history.

(56) References Cited

U.S. PATENT DOCUMENTS

| | | | | |
|---|---|---|---|---|
| 4,754,641 A | * | 7/1988 | Orban | G01F 1/66 73/152.32 |
| 5,063,776 A | * | 11/1991 | Zanker | G01F 1/002 73/152.21 |

(Continued)

FOREIGN PATENT DOCUMENTS

| EP | 0437872 A3 | 7/1991 |
|---|---|---|
| EP | 3480628 A1 | 5/2019 |

(Continued)

OTHER PUBLICATIONS

First Exam Report issued in United Kingdom Patent Application No. 2305271.5 dated Mar. 25, 2024, 2 pages.
(Continued)

*Primary Examiner* — Robert E Fuller
*Assistant Examiner* — Ursula Lee Norris
(74) *Attorney, Agent, or Firm* — Jeffrey D. Frantz

(57) ABSTRACT

A technique facilitates monitoring of events related to various well operations. According to an embodiment, the technique provides a non-invasive approach to measuring fluid and solids transport through well surface pipe assemblies. The desired information may be detected and obtained by mounting sensors to the exterior of pipes, thus enabling retrofitting of the sensor system to existing assemblies at a desired time during a given operation. Additionally, the technique may utilize a combination of sensors and systems for measuring fluid and solids transport through well flow (Continued)

path assemblies. The measurements obtained may be used to provide real-time monitoring of surface flow conditions as well as of downhole wellbore conditions and of the status of downhole equipment.

18 Claims, 4 Drawing Sheets

(51) Int. Cl.
*E21B 44/00* (2006.01)
*E21B 47/00* (2012.01)
*E21B 47/06* (2012.01)
*E21B 47/07* (2012.01)
*G01F 1/74* (2006.01)

(56) References Cited

U.S. PATENT DOCUMENTS

| | | | |
|---|---|---|---|
| 6,176,323 B1* | 1/2001 | Weirich | E21B 44/005 |
| | | | 175/40 |
| 6,257,354 B1 | 7/2001 | Schrader | |
| 7,308,941 B2 | 12/2007 | Rolovic et al. | |
| 7,703,529 B2 | 4/2010 | Robinson et al. | |
| 9,453,404 B2 | 9/2016 | Shampine et al. | |
| 10,859,481 B2* | 12/2020 | van Oort | E21B 21/01 |
| 11,619,124 B2 | 4/2023 | Morrison | |
| 11,808,097 B2 | 11/2023 | Morrison | |
| 11,952,845 B2* | 4/2024 | Lu | E21B 21/08 |
| 12,000,261 B2 | 6/2024 | Liu | |
| 12,044,124 B2* | 7/2024 | Al-Malki | E21B 44/00 |
| 12,312,937 B2* | 5/2025 | Safonov | E21B 47/002 |
| 2007/0047867 A1* | 3/2007 | Goldner | E21B 47/107 |
| | | | 385/12 |
| 2007/0205000 A1 | 9/2007 | Hosie | |
| 2013/0048380 A1* | 2/2013 | Rasmus | E21B 49/005 |
| | | | 166/250.01 |
| 2015/0122505 A1 | 5/2015 | Judge | |
| 2015/0377667 A1* | 12/2015 | Ahmad | G01F 1/74 |
| | | | 702/48 |
| 2017/0328152 A1* | 11/2017 | Jaffrey | G01F 1/74 |
| 2018/0080317 A1 | 3/2018 | Hopper | |
| 2021/0172272 A1* | 6/2021 | Rakhunde | E21B 34/066 |
| 2023/0167695 A1* | 6/2023 | Al-Malki | E21B 21/06 |
| | | | 175/40 |
| 2023/0383646 A1 | 11/2023 | Yip | |
| 2024/0287859 A1 | 8/2024 | Dvorak | |
| 2024/0287860 A1 | 8/2024 | Su | |
| 2024/0287883 A1 | 8/2024 | Tardy | |
| 2024/0426183 A1 | 12/2024 | Zheng | |
| 2025/0027402 A1 | 1/2025 | Abuhaikal | |
| 2025/0084754 A1 | 3/2025 | Hassig Fonseca | |
| 2025/0084758 A1 | 3/2025 | Tardy | |

FOREIGN PATENT DOCUMENTS

| | | |
|---|---|---|
| WO | 2015005998 A1 | 1/2015 |
| WO | 2015069231 A1 | 5/2015 |
| WO | 2017083449 A1 | 5/2017 |
| WO | 2024035758 A1 | 2/2024 |
| WO | 2024118706 A1 | 6/2024 |
| WO | 2024151569 A1 | 7/2024 |
| WO | 2024229316 A1 | 11/2024 |
| WO | 2024263839 A1 | 12/2024 |
| WO | 2025096987 A1 | 5/2025 |
| WO | 2025122527 A1 | 6/2025 |

OTHER PUBLICATIONS

International Preliminary Report on Patentability issued in International Patent application PCT/US2021/053788, dated Apr. 20, 2023, 8 pages.
International Search Report and Written Opinion issued in International Patent application PCT/US2021/053788 on Jan. 7, 2023, 11 pages.
SLB, AvantGuard Advanced flowback service, sales brochure, 2016, 1 page. Downloaded from: https://www.slb.com/reservoir-characterization/reservoir-testing/flowback-testing/avantguard-flowback-services.
SLB, ACTive Power, CT real-time powered downhole measurements system, sales brochure, 2020, 1 page. Downloaded from: https://www.slb.com/well-intervention/coiled-tubing-intervention/active-real-time-downhole-coiled-tubing-services/active-power-ct-powered-measurements-system.
SLB, Real-Time Downhole Measurements, 2023, 5 pages. Website: https://www.slb.com/well-intervention/coiled-tubing-intervention/active-real-time-downhole-coiled-tubing-services.

* cited by examiner

SYSTEM AND METHOD FOR NON-INVASIVE DETECTION AT A WELLSITE

CROSS-REFERENCE TO RELATED APPLICATIONS

This application is a National Stage Entry of International Application No. PCT/US2021/053788, filed Oct. 6, 2021, which claims priority to U.S. Provisional Application No. 63/088,668, filed Oct. 7, 2020, which is incorporated herein by reference in its entirety.

BACKGROUND

In many well applications, various fluid pumping operations are carried out during performance of a given well operation, e.g. a well treatment operation. In some of these operations, fluids are pumped downhole and output fluids or flowback fluids are returned back to the surface or directed to other suitable locations. Various instruments may be used to monitor fluid flows moving downhole. However, very little information tends to be obtained regarding the output or flowback fluids and thus valuable insight into the overall well operation may be lost. In other applications, insufficient detection methods lead to difficulty in detecting certain downhole events.

SUMMARY

In general, a methodology and system are provided for facilitating improved monitoring of events related to various well operations. According to an embodiment, the technique provides a non-invasive approach to measuring fluid and solids transport through well surface pipe assemblies. The desired information may be detected and obtained by mounting sensors to the exterior of pipes, thus enabling retrofitting of the sensor system to existing assemblies at a desired time during a given operation. Additionally, the technique may utilize a combination of sensors and systems for measuring fluid and solids transport through well flow path assemblies. The measurements obtained may be used to provide real-time monitoring of surface flow conditions as well as of downhole wellbore conditions and of the status of downhole equipment.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
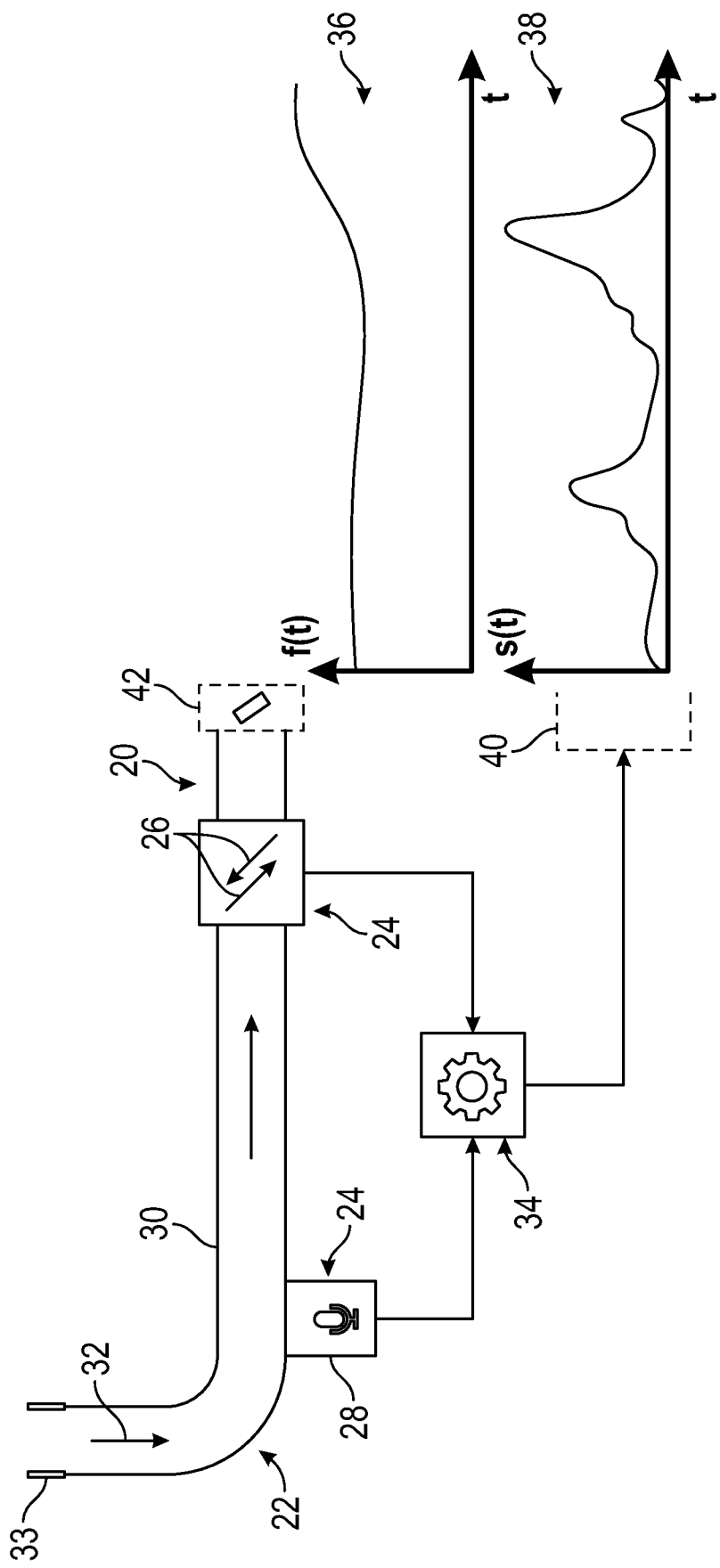
FIG. 1 is a schematic illustration of an example of a system for non-invasive detection and monitoring at a wellsite, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system for facilitating improved monitoring of events related to various well operations. For example, the methodology and system may provide a non-invasive technique for measuring fluid and solids transported through well surface pipe assemblies using sensors mounted on the exterior of the pipe. The ability to mount sensors along the exterior of pipe enables retrofitting of the sensor system to existing assemblies at a desired time during a given operation. For example, the system can be rapidly added to existing assemblies at any time during an operation without interrupting pipe connections.

Additionally, the technique may utilize a combination of sensors and systems for measuring fluid and solids transport through various other well flow path assemblies. The measurements obtained may be used to provide real-time monitoring of surface flow conditions as well as of downhole wellbore conditions and of the status of downhole equipment. The data can be used to provide live interpretations of downhole conditions such as annular velocity and Reynolds number. These values provide important information regarding solids transport through the wellbore. Additionally, the values can be used as indicators of flow regime, e.g. turbulent versus laminar flow, and solids transport velocity.

According to an embodiment, the system is able to achieve the non-invasive operation through the use of specific types of sensors, e.g. ultrasonic and acoustic sensors, to achieve the desired detection. The sensors may be clamped or otherwise secured to the outside of a given pipe or pipes. Using sound waves and acoustic detection, the rate of fluid and solids flowing through the pipe past the sensors can be readily determined. A data acquisition system may be used to digitize these measurements and to provide the measurements via standard protocols to suitable processing software in, for example, a wellsite automation control system.

Thus, the system is able to provide a real-time quantification of fluid and solids traveling through a flowback assembly to facilitate monitoring of performance and to provide a feedback input with respect to a wellsite automation workflow. For example, the rate and composition of return fluids from well circulation during various well operations can provide valuable insight into performance of the well operation. The use of non-invasive sensors, e.g. ultrasonic and acoustic sensors, avoids compatibility issues which can occur when using conventional, non-standardized flowback services and equipment. Furthermore, the non-invasive nature and operation of such sensors enables the installation of such sensors on many types of flowback assemblies. By way of example, the system may utilize onboard data processing to produce real-time quantification of rate of flow and mass of solids being returned through a flowback assembly.

The data obtained may further be combined with well geometry specifications to produce real-time estimations of downhole annular velocity. Downhole Reynolds numbers also can be estimated using surveys of the density and viscosity of return fluid. Such downhole Reynolds numbers provide an indication of the efficiency with which downhole solids can be entrained and carried to the surface with the returning flow.

Data made available by such sensors during a number of well intervention operations enables visibility into the real-time effects of process settings on the actions taken against the well. For wellsite automation workflows that use flowback parameters as inputs, the system described herein can serve as a link in the automation feedback loop. It should be noted that most equipment in the oil field uses industry-standard, off-the-shelf communication equipment and protocols, e.g. Modbus TCP, and the system described herein may be configured to be compatible with such equipment and protocols.

Referring generally to FIG. 1, an example of a non-invasive sensor system 20 is illustrated as employed at a wellsite on a well surface pipe assembly 22. According to this embodiment, the sensor system 20 may comprise a plurality of sensors 24. By way of example, the sensors 24 may comprise ultrasonic and acoustic sensors, such as flow meter sensors 26, e.g. two flow meter sensors, and at least one acoustic solids sensor 28. As illustrated, the sensors 24 may be clamped or otherwise secured to the exterior of a pipe(s) 30 of well surface pipe assembly 22. In this embodiment, the sensors 24 are non-invasive which means the sensors are on the outside of the pipe(s) 30 rather than being physically exposed to an interior of the pipe(s) 30. This facilitates retrofitting of the non-invasive sensor system 20 onto existing pipe systems without cutting or drilling through the pipes.

In the specific example illustrated, two flow meter sensors 26 are positioned along the pipe 30 to measure fluid rate in the pipe 30. The flow meter sensors 26 may use various ultrasonic methods to cover a large spectrum of solids composition in the flow to detect and monitor fluid rate. The acoustic solids sensor 28 also may be clamped or otherwise secured to the outside of pipe 30. The acoustic solids sensor 28 may be configured to listen (through the wall of pipe 30) to acoustic signatures from solids in a fluid flow 32 passing along the interior of pipe 30. The acoustic solids sensor 28 may be used to provide an estimation of mass available as a rate and total over time. By way of example, the fluid flow 32 may comprise fluid returns from the well which enter pipe 30 at a returns inlet 33.

With additional reference to FIG. 1, the acquired measurements from sensors 24 may be provided to a central data acquisition system 34. This allows the measurements to be processed internally and output as a real-time calculation of flow rates and solid rates, as indicated by graphs 36 and 38, respectively. The outputs may be provided in industry-standard format to facilitate the use of this output data by, for example, a wellsite automation solution 40. The wellsite automation solution 40 may utilize this data for improved adjustment of the overall well operation. For example, the wellsite automation solution 40 may use the data received to automatically control a choke assembly 42 located in, for example, a flow back manifold. The data received may be continually monitored and used in a feedback loop in real time to enable continuous adjustment of choke assembly 42 and/or to provide other controls according to the measured flow rate and solids content of returning fluid flow 32 entering surface pipe assembly 22 via returns inlet 33.

Figure 2:
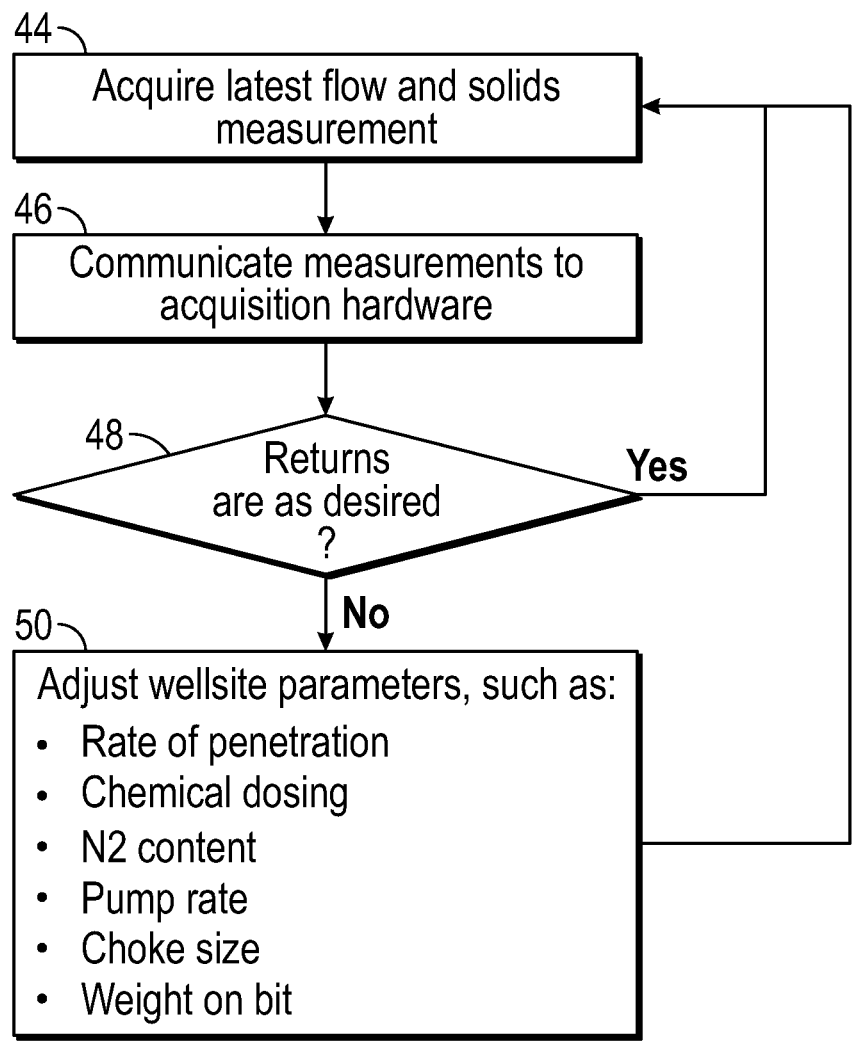
FIG. 2 is a flowchart illustrating an example of a methodology for detecting and monitoring parameters at a wellsite, according to an embodiment of the disclosure.

Referring generally to FIG. 2, an example of the overall methodology is illustrated. According to this example, measurement data on flow rates and solids rates of returning fluid is initially acquired by sensors 24, as indicated by block 44. The measurement data is communicated to the central data acquisition system 34, as represented by block 46. The data acquisition system 34 is used to determine whether the returning fluid has the solids content and flow rates desired, as indicated by question block 48. If the returning fluid flow is within the desired range, the loop of measurement data acquisition and communication of that measurement data to data acquisition system 34 is continued.

If, however, the returning fluid is not within the desired range, then wellsite parameters may be adjusted by, for example, wellsite automation system 40, as indicated by block 50. Examples of adjustments that can be made to wellsite parameters include adjusting: rate of penetration; chemical dosing; nitrogen (N2) content; pump rate; choke size; and weight on bit used in the drilling operation.

Figure 3:
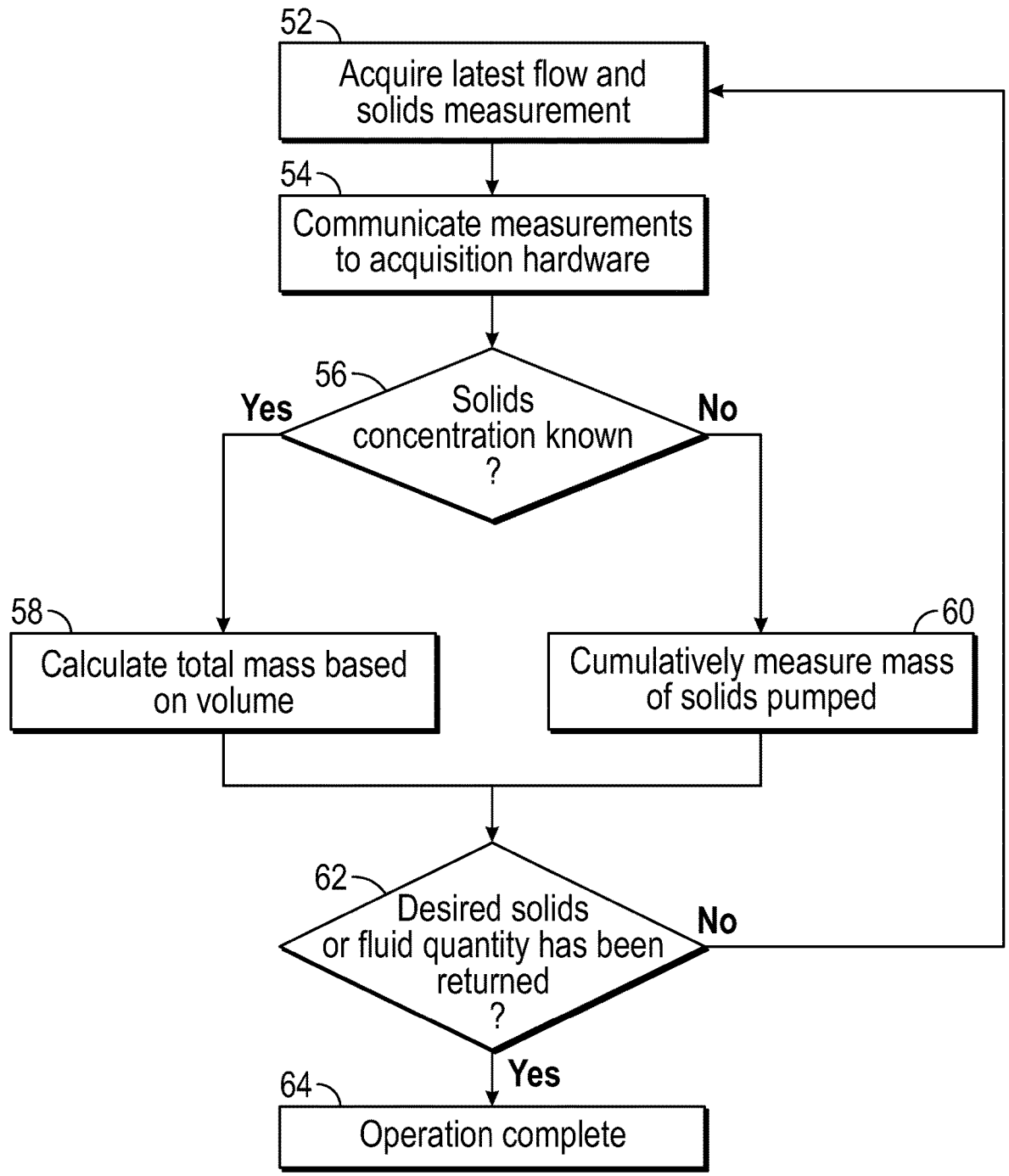
FIG. 3 is a flowchart illustrating another example of the methodology for detecting and monitoring parameters at a wellsite, according to an embodiment of the disclosure.

Another example of overall methodology is illustrated in the flowchart of FIG. 3. In this example, measurement data on flow rates and solids rates of returning fluid is initially acquired by sensors 24, as indicated by block 52. The measurement data is communicated to the central data acquisition system 34, as represented by block 54. The data acquisition system 34 is used to determine whether the solids concentration in the returning fluid is known, as indicated by question block 56. If the solids concentration is known, the total mass based on volume may be calculated, as indicated by block 58. If, however, the solids concentration is not known then the mass of solids pumped may be cumulatively measured, as indicated by block 60.

At this stage, the data acquisition system 34 is used to determine whether the desired solids or fluid quantity has been returned, as indicated by question block 62. If not, the loop of measurement data acquisition, communication of that measurement data to data acquisition system 34, and knowledge of solids concentration is continued. However, if the desired solids or fluid quantity has been returned, then the operation is completed, as indicated by block 64.

The sensors 24 and the data acquisition system 34 may be used to collect and process various data according to various methodologies to determine desired information related to a given well operation. In a manual workflow, for example, returns of fluid or slurry circulated during a well intervention treatment may be monitored. For example, returns may be monitored in real-time using the non-invasive sensors 24 during various interventions in a well which may include milling plugs, cementing, and fill cleanouts.

Based on the fluid rates and solids surface rates 36, 38, as well as on fluid parameters such as viscosity, density, and/or other parameters, the data acquisition system may be used to calculate downhole conditions such as annular velocity, Reynolds number, and flow regime. Based on this calculation, manual or automated changes may be made to well site conditions. Examples of such changes include varying a choke aperture size, adjusting the rate of penetration, changing a fluid pump rate, adjusting a nitrogen rate, changing a chemical additive concentration, adjusting the weight on the downhole assembly, and/or making other changes to the well operation. Depending on the level of equipment automation at the wellsite, portions or all of these operational adjustments may be automated in response to detection and monitoring of parameters via the non-invasive sensors 24.

The methodology also may be used to identify changes in fluid/slurry types and composition. According to an operational example, a train of fluids having different chemical or physical properties, e.g. different viscosity, density, solids concentration, solids type, and/or other properties, are circulated downhole. The fluid returns are then monitored on the surface via sensors 24 to obtain information on when each fluid arrives at the surface.

According to additional examples, the methodology may be used for monitoring fluid and solids injected into a well during a well treatment operation. For example, a fluid that may contain solids is injected into a well and surface flow is monitored via sensors 24. Based on the fluid rate monitored, a determination may be made as to when the desired volume of fluid has been returned. If the solids concentration is known, the fluid rate may be used to determine total quantity of solids in the well. Or, if the solids have been characterized, the solids intensity may be used to determine the total quantity of solids in the well.

With the information obtained via sensors 24 and suitable processing by data acquisition system 34, manual or automatic adjustments may be made to adjust wellsite equipment, e.g. pumps, to achieve a more desired result. Effectively, operation of sensors 24 and data acquisition system 34 facilitate the use of system outputs as parameters for wellsite automation regarding downhole conditions so as to optimize intervention performance. The optimization of intervention performance may, for example, involve more efficient removal of debris from a well or better optimized chemical usage.

However, the surface data acquisition and processing may be used to improve the knowledge and performance related to many types of well operations. For example, the data acquisition and processing may be used to monitor plugs returned to the surface so as to optimize debris removal from a wellbore. Additionally, the system and methodology may be used to monitor gravel being added to a gravel pack to ensure the gravel in the gravel pack reaches a desired quantity. The system and methodology also may be used to provide real-time indication of decreasing returns which could result in debris settling in the wellbore and trapping coiled tubing. Similarly, the system and methodology may be used to simply monitor the total fluid injected into a well. In some applications, the system and methodology also may be used to monitor a train of fluids being circulated to surface and to detect when a change in fluid type occurs. Examples of such changes in fluid type include changes from a clean fluid to a slurry or changes from a slurry with a low concentration of solids to a slurry with a higher concentration of solids.

Figure 4:
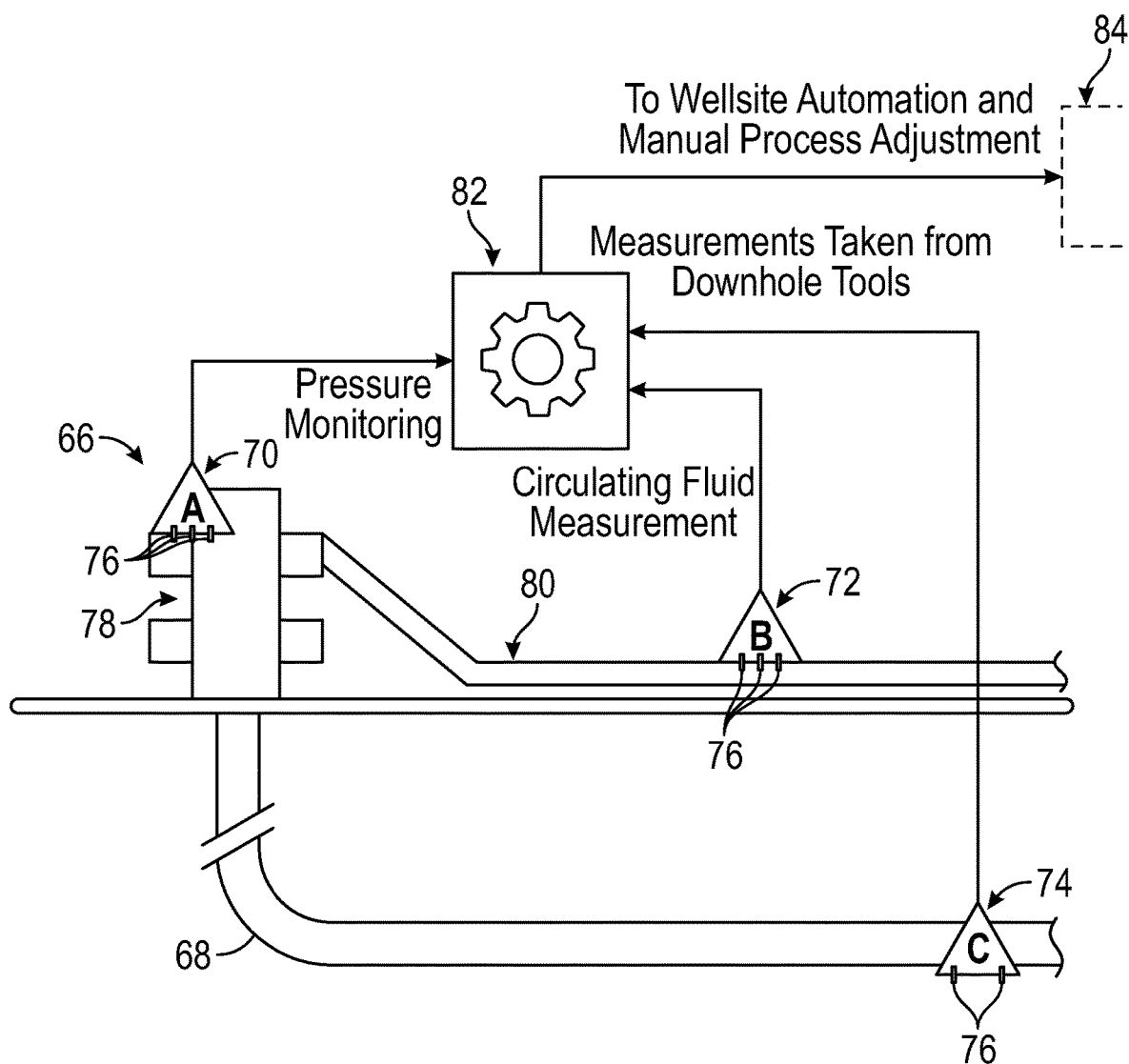
FIG. 4 is a schematic illustration of another example of a system for detection and monitoring at a wellsite, according to an embodiment of the disclosure.

Referring generally to FIG. 4, another embodiment of a system and methodology for detecting downhole events is illustrated. In this embodiment, multiple sensor systems are used to measure fluid and solids transport along paths through well flow assemblies. The sensor systems may use a combination of sensors which can be placed on the outside of a pipe or positioned as part of a well intervention component. The configuration of the systems and the ability to externally mount at least some of the sensors facilitates rapid addition of components to existing assemblies at various times during an operation without interrupting pipe connections.

Measurements obtained by this type of overall system may be used to provide real-time monitoring of surface flow conditions with respect to fluid and solids rates as well as with respect to downhole wellbore conditions and the status of downhole equipment. The data obtained may be used to provide live interpretations of downhole conditions, e.g. conditions such as annular velocity, Reynolds number, zonal flow, zonal isolation, mechanical and electrical tool response, downhole wellbore conditions, completion information, and downhole tool location. The data obtained provides important information regarding the well and downhole device response to a well intervention. The information obtained also may be used to automate equipment response to given downhole conditions.

The multiple systems may be positioned at various locations on a wellsite so as to obtain the desired data on wellbore conditions and to thus provide important feedback on wellsite operations. The multiple systems may incorporate a variety of sensors to measure desired parameters which aid in evaluating the wellbore intervention operation and/or other operation. The sensors may be selected to monitor parameters such as fluid flow, wellbore annulus pressure, casing pressure, circulating pressure, acoustic frequencies, mechanical vibration, electrical response, mechanical response, downhole pressure, downhole temperature, distributed temperature, position and location of downhole apparatuses, wellbore anomalies, downhole device activation, and downhole flow. Accumulating and processing the combined data can provide greater insight into and enhance control of the well intervention operation. The data may be acquired, processed, and provided in real-time to a manual workflow or as input to a wellsite automation system so as to enable automatic adjustment.

Referring again to FIG. 4, an example of an overall sensor system 66 is illustrated as employed at a wellsite. The overall sensor system 66 may be used to identify conditions in a wellbore 68 before, during, and after a well intervention operation. This can be achieved by constructing the overall sensor system 66 with a plurality of different sensor systems 70, 72 and 74. In the illustrated example, sensor system 70 may have a plurality of sensors 76 and may be mounted on, in, and/or adjacent a wellhead 78. According to this example, sensor system 72 also may have one or more sensors 76 and may be mounted on a well surface pipe assembly 80 for monitoring surface conditions and/or monitoring the circulating fluid path through well surface pipe assembly 80. Additionally, sensor system 74 also includes at least one sensor 76 and may be in the form of a downhole sensor system which may be positioned on downhole equipment and used to obtain downhole measurements in addition to data related to the response of the formation to treatment operations.

The acquired measurements from sensors 76 of the different sensor systems 70, 72, 74 may be provided to a central data acquisition system 82. This allows the measurements from the different sensor systems 70, 72, 74 to be processed internally so as to determine valuable information regarding a given treatment operation and/or other well related operation. In some embodiments, the data may be processed by data acquisition system 82 and resulting data/information may be output in real-time. The output data may be provided to an operator who may then take the appropriate action. In some embodiments, however, the resulting data/information is provided to a wellsite automation solution 84. The wellsite automation solution 84 may utilize this data for automatically providing adjustments as needed to the overall well operation. For example, the wellsite automation solution 84 may use the data received to automatically control a rate of fluid flow downhole. The data received may be continually monitored and used in a feedback loop in real time to enable continuous adjustments to the wellbore operation.

The various sensor systems 70, 72, 74 may be used to monitor many types of downhole and surface parameters. By way of example, the sensor system 70 on wellhead 78 may be used to monitor pressure oscillations at the wellhead. Such pressure oscillations may be due to downhole actuations such as actuation of: an agitator, a circulating module, a nozzle, a vibrator, ajar, a hammer, a rotating nozzle, an accelerator, a tractor, a logging activity, an inflatable packer, a mechanical packer, or a perforating gun. The pressure oscillations also may be due to fluid flow changes, e.g. water hammers, as well as operation of hydraulic pumps and other sources. This data can be combined with real-time flow information obtained from the other sensor systems 72, 74. Examples of real-time flow information include measurements from circulated fluid in a surface line, characteristics of fluid injected into a well, and downhole data provided from a downhole tool. Additional process parameters may be obtained via sensor systems 70, 72, 74 or otherwise provided to data acquisition system 82, and examples of such process parameters include coiled tubing weight, circulating pressure, casing pressure, and a casing annulus pressure.

Understanding the conditions in wellbore 68 before, during, and after a well intervention can provide important information for adjustment to process parameters either via manual workflow adjustment or adjustment via automated system. Examples of such adjustments include: adjustments to speed of string injection, rate of penetration, downhole device actuation, surface injection rate, fluid gas content, and/or other adjustments. Examples of improvements resulting from the data detection and corresponding adjustment include: enhanced correlation of downhole parameters based on surface measurements, measurement of contact time with a downhole object, e.g. plug or packer, measurement of response of the downhole actuator, differentiation of genuine encounters of the downhole object from other events that could have similar surface signatures, e.g. a pipe sticking or slipping due to friction, optimization of the rate of penetration into the wellbore, automation of plug milling based on coiled tubing parameters during plug contact, improvement in the homogeneity and quality of debris so as to reduce the risk of a stuck pipe, improvement of the transport of debris in a wellbore, reduction in the number of short trips due to the improved quality of debris, reduction of fatigue on a coiled tubing string due to fewer short trips and less cycling, reduction of stalls in a motor, and extension of the lifetime of elements of the wellbore due to reduced stress.

The presence and actuation of the downhole device, e.g. a frac plug or a sliding sleeve, can provide a reflection point creating a wave which travels up the wellbore annulus as well as up the coiled tubing. Such waves may be measured by sensor 24/76 in the form of a distributed vibration sensor (DVS) cable or by a distributed acoustic signal (DAS) cable that can detect the change and flow conditions and the wellbore. This data can be combined with downhole pressure and temperature change data measured by a downhole indicator sensor 24/76. In addition, pump noise detected by the same sensors 24/76 may be auto correlated to track the coil tubing during pumping operations. Such sensors may be part of downhole sensor system 74.

Accordingly, the sensor systems 70, 72, 74 may be used to enable a wide variety of combined monitoring of parameters at a wellsite. The combined data may be provided to the central data acquisition system 82 for processing to facilitate the manual and/or automated system adjustments which improve the overall intervention operation or other wellsite operation. The combined monitoring can be applied to many types of parameters including fluid flow, wellbore annulus pressure, casing pressure, circulating pressure, acoustic frequencies, mechanical vibration, electrical response, mechanical response, downhole pressure, downhole temperature, distributed temperature, position and location of downhole apparatuses, wellbore anomalies, downhole device activation, and downhole flow. The collected data on such parameters may be processed to identify, for example, production of gas and solids by using depth correlation with zonal identification to determine zonal production or to optimize well balance during fluid circulation.

The collected data also can be processed to help minimize damage to fracture conductivity and proppant pack and also to minimize mechanical damage to the formation due to aggressive changes in balance resulting when, for example, fracturing brittle rock. Additionally, the data may be used to identify the depth of a sudden vacuum zone or other changes occurring during an intervention and to determine tool performance characteristics such as stalls, rotational variation, and plug or obstruction contact. Furthermore, rotational signatures may be used to determine whether solids are being effectively transported to the surface.

Other uses of the collected data include identification of communication behind multizone completions including behind swell packers, cemented liners, or other components, while also identifying leaks in: casing, inflow control devices, and other components. The identification may be accomplished by monitoring both the casing and coiled tubing pressure signatures, and such data also can be used to confirm the mechanical integrity of the casing and the cement. In some applications, the data may be used to identify communications within a formation due to, for example, a crossflow.

The data may be collected and processed to determine whether a downhole flow restriction device is open or closed. Similarly, the data may be used to detect diameter variations within a completion, e.g. a washout or constrictions due to casing collapse or scale. In some embodiments, the data can also be correlated with data previously collected, e.g. previously collected during a wireline run. The data also may be used to identify a window of an unnatural wellbore path, such as in a multilateral well; to identify effective chemical diversion; and to demonstrate temporary closing of zones and redistribution of zonal flow.

Further examples include processing the collected data to identify the formation of hydrates in subsea wells or pipelines. The data also may be used to monitor an offset well during treatment of an injection well to confirm changes in zonal pressure or production (either concurrently or as a delayed effect). Additionally, the data may be used to monitor and track coiled tubing drilling losses, motor health, or other component parameters. In some applications the data may effectively be used to detect the presence, location, and seal quality of temporary and permanent well isolation devices. Similarly, the data may be evaluated to confirm a successful injection of chemical well isolation treatment and to determine the integrity of a well control barrier such as a stripper or blowout preventer.

According to various embodiments, the measurements acquired from the various sensor systems 70, 72, 74 may be used to inform a manual workflow regarding desired adjustments to the well operation. Examples of adjustments include adjusting the rate of injection of the string and adjusting the rate of penetration for various types of debris, obstructions, or downhole completion elements. The adjustments also may involve adjusting contact intensity and duration with an obstruction, adjusting downhole device actuation, adjusting surface injection rate, or adjusting fluid gas content.

Furthermore, the adjustments may be made to flowback or production rates, e.g. through aperture modulation, to maintain well balance in a desired range and correlated with pump rate and chemical dosage. The data collected also may be used to make adjustments with respect to selection of a desired path in a multi-lateral well. Additional adjustments may include changing the response of well control/integrity barriers. It should be noted the measurements acquired through the sensor systems 70, 72, 74 also may be input to automated wellsite system 84 which can be used to control one or more of the parameters in real-time without human intervention. The specific types of data acquisition systems 34/82 and wellsite systems 40/84 may vary according to the objectives of a given operation. In a variety of operations, off-the-shelf computer-based data acquisition systems and wellsite systems may be employed to process data and/or to make system adjustments based on the processed data.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for monitoring at a wellsite, the method comprising:
   circulating one or more fluids downhole within a well;
   positioning non-invasive sensors along a flowback pipe assembly at the wellsite, the flowback pipe assembly receiving fluid returns comprising the one or more fluids exiting the well;
   performing a well intervention operation in which the fluid returns exiting the well are directed through the flowback pipe assembly;
   obtaining data from the non-invasive sensors, the data being related to the fluid returns flowing through the flowback pipe assembly;
   providing the data to a data acquisition system;
   processing the data, via the data acquisition system, to determine conditions of the fluid returns, the conditions of the fluid returns comprising a flow rate and a solids rate of the fluid returns flowing through the flowback pipe assembly;
   estimating, via the data acquisition system, downhole conditions of the one or more fluids circulating downhole within the well based on the conditions of the fluid returns and at least one fluid property of the one or more fluids, the at least one fluid property comprising a density and/or a viscosity of each fluid of the one or more fluids, the downhole conditions comprising at least one of a downhole Reynolds number of the one or more fluids, a downhole annular velocity of the one or more fluids, or a downhole flow regime of the one or more fluids;
   determining, via the data acquisition system, non-optimal conditions of the fluid returns, the non-optimal conditions of the fluid returns being indicative of non-optimal downhole conditions of the one or more fluids circulating downhole within the well; and
   making changes to the well intervention operation to improve the non-optimal conditions of the fluid returns, wherein the making of the changes comprises adjusting a parameter of the well intervention operation.

2. The method as recited in claim 1, wherein the making of the changes comprises adjusting a choke size of the flowback pipe assembly.

3. The method as recited in claim 1, wherein the making of the changes comprises adjusting the parameter including a rate of penetration, a string injection rate, a surface injection rate, a fluid gas content, a nitrogen rate, a chemical dosing rate, or a weight on downhole equipment.

4. The method as recited in claim 1, wherein the positioning of the non-invasive sensors comprises positioning ultrasonic sensors.

5. The method as recited in claim 1, wherein the positioning of the non-invasive sensors comprises positioning an acoustic solids sensor.

6. A method for monitoring at a wellsite, the method comprising:
   circulating one or more fluids downhole within a well of a well system;
   locating a plurality of different sensor systems throughout the well system located at the wellsite;
   performing a well intervention operation wherein fluid returns comprising the one or more fluids exiting the well are directed through a flowback pipe assembly;
   obtaining data on the well intervention operation in real-time via the plurality of different sensor systems;
   providing the data to a central data acquisition system;
   processing the data via the central data acquisition system to determine conditions of the fluid returns exiting the well of the well system, the conditions of the fluid returns comprising a flow rate and a solids rate of the fluid returns flowing through the flowback pipe assembly;
   estimating, via the central data acquisition system, downhole conditions of the one or more fluids circulating downhole within the well based on the conditions of the fluid returns and at least one fluid property of the one or more fluids, the at least one fluid property comprising a density and/or a viscosity of each fluid of the one or more fluids, the downhole conditions comprising at least one of a downhole Reynolds number of the one or more fluids, a downhole annular velocity of the one or more fluids, or a downhole flow regime of the one or more fluids;
   determining, via the central data acquisition system, non-optimal conditions of the fluid returns, the non-optimal conditions of the fluid returns being indicative of non-optimal downhole conditions of the one or more fluids circulating downhole within the well; and
   based on determinations made by the central data acquisition system, making adjustments to the well intervention operation to improve the downhole conditions, wherein the making of the adjustments comprises adjusting a parameter of the well intervention operation.

7. The method as recited in claim 6, wherein the making of the adjustments comprises adjusting the parameter including a rate of penetration, a string injection rate, a surface injection rate, a fluid gas content, a nitrogen rate, a chemical dosing rate, or a weight on downhole equipment.

8. The method as recited in claim 6, wherein the making of the adjustments comprises adjusting a choke size of the flowback pipe assembly.

9. The method as recited in claim 6, wherein the locating of the plurality of different sensor systems comprises locating a first sensor system of the plurality of different sensor systems on a surface pipe of the flowback pipe assembly.

10. The method as recited in claim 9, wherein the locating of the plurality of different sensor systems comprises locating a second sensor system of the plurality of different sensor systems on downhole equipment.

11. The method as recited in claim 10, wherein the locating of the plurality of different sensor systems comprises locating a third sensor system of the plurality of different sensor systems on a wellhead.

12. The method as recited in claim 6, wherein the obtaining of the data comprises obtaining flow data, pressure data, temperature data, and vibration data.

13. The method as recited in claim 6, wherein the obtaining of the data comprises obtaining the data before, during, and after the well intervention operation.

14. A system, comprising:
a plurality of pipes configured to receive well fluids flowing through a wellbore, the plurality of pipes comprising a wellhead pipe assembly and a well surface pipe assembly, the wellhead pipe assembly being located proximate a wellhead upstream from the wellbore and the well surface pipe assembly receiving the well fluids downstream from the wellbore;
a well sensor system having a plurality of non-invasive sensors positioned along exteriors of the plurality of pipes, wherein a first non-invasive sensor of the plurality of non-invasive sensors is located on the wellhead pipe assembly and a second non-invasive sensor of the plurality of non-invasive sensors is located on the well surface pipe assembly, the plurality of non-invasive sensors being mounted and oriented to detect data related to the well fluids moving through the plurality of pipes;
a data acquisition system to enable collection and processing of the data from the plurality of non-invasive sensors, wherein the data acquisition system is configured to:
process the data to determine surface conditions of the well fluids flowing through the well surface pipe assembly, the surface conditions of the well fluids comprising a flow rate and a solids rate of the well fluids flowing through the well surface pipe assembly;
estimate downhole conditions of the well fluids flowing through the wellbore based on the surface conditions of the well fluids and at least one fluid property of the well fluids, the at least one fluid property comprising a density and/or a viscosity of each well fluid of the well fluids, the downhole conditions comprising at least one of a downhole Reynolds number of the well fluids, a downhole annular velocity of the well fluids, or a downhole flow regime of the well fluids; and
determine non-optimal surface conditions of the well fluids, the non-optimal surface conditions of the well fluids being indicative of non-optimal downhole conditions of the well fluids flowing through the wellbore; and
an automated wellsite system configured to control one or more parameters of a well intervention operation based on the determinations made by the data acquisition system.

15. The system as recited in claim 14, wherein the non-invasive sensors of the plurality of non-invasive sensors are secured to individual pipes of the plurality of pipes.

16. The system as recited in claim 14, wherein a third non-invasive sensor of the plurality of non-invasive sensors is located downhole.

17. The system as recited in claim 14, wherein the data acquisition system is configured to process the data in real-time.

18. The system as recited in claim 14, wherein the one or more parameters include a choke size of the well surface pipe assembly, a rate of penetration, a string injection rate, a surface injection rate, a fluid gas content, a nitrogen rate, a chemical dosing rate, or a weight on downhole equipment.

* * * * *